United States Patent [19]

Berube et al.

[11] Patent Number: 5,011,534

[45] Date of Patent: Apr. 30, 1991

[54] CALCINED KAOLIN CLAY FILLER PIGMENT FOR ENHANCING OPACITY AND PRINTING PROPERTIES OF NEWSPRINT AND MECHANICAL PAPERS

[75] Inventors: Richard R. Berube, Holmdel, N.J.; John S. Babiec, Jr., Berwyn, Pa.; M. Phillip Jameson, Sommerville; Andrew R. Negele, Edison, both of N.J.; Mitchell J. Willis, Macon, Ga.

[73] Assignee: Engelhard Corporation, Iselin, N.J.

[21] Appl. No.: 479,793

[22] Filed: Feb. 14, 1990

[51] Int. Cl.$^5$ .............................................. C04B 14/10
[52] U.S. Cl. .................................. 106/416; 106/485; 106/486; 501/144; 501/145; 162/181.6; 162/181.8
[58] Field of Search ................... 162/181.6, 181.8; 106/416, 485, 486; 501/144, 145, 150

[56] References Cited

U.S. PATENT DOCUMENTS

| | | | |
|---|---|---|---|
| 3,372,043 | 3/1968 | Fanselow | 106/486 X |
| 4,381,948 | 5/1983 | McConnell et al. | 501/145 X |
| 4,717,559 | 1/1988 | Cummings et al. | 423/328 |

*Primary Examiner*—Karl Group

[57] ABSTRACT

A low-abrasion calcined kaolin opacifying pigment composed of particles in the size range of about 70 to 84% by weight finer than 2 microns and having a color defined by Hunter Trisitimulus values of "L" within the range of 92 to 94, "a" within the range of +1.0 to +2.2 and "b" within the range of +6.4 to +7.5. The pigment is produced by novel wet processing including high solids degritting of a high iron, high titania content Tertiary kaolin without conventional fractionation, bleaching and dewatering to isolate a fine particle size fraction, followed by spray drying, pulverization, calcination and repulverization.

3 Claims, No Drawings

CALCINED KAOLIN CLAY FILLER PIGMENT FOR ENHANCING OPACITY AND PRINTING PROPERTIES OF NEWSPRINT AND MECHANICAL PAPERS

FIELD OF THE INVENTION

This invention relates to novel low abrasion calcined kaolin clay filler pigments, their use in filling mechanical pulp-containing paper and to the manufacture of the calcined clay filler pigment using selected crude (uncalcined) kaolin clays as the source of the calcined clay.

BACKGROUND OF THE INVENTION

Low abrasion calcined kaolin pigments are currently used primarily, but not exclusively, as fillers and coating pigments for paper and paperboard products. This represents one of the largest uses of any industrial mineral. Manufacturing facilities produce vast quantities of low abrasion calcined kaolin pigments. The pigments are supplied as dry powders and as aqueous slurries. Use of these pigments for filling paper significantly reduced the consumption by the industry of other opacifiers such as precipitated silicas, alumina trihydrate and synthetic silicates.

Long prior to the invention of low abrasion calcined kaolin pigments it was known that raw (uncalcined) kaolin clay undergoes profound physical and chemical changes when it is heated and that such changes vary with the source of the clay as well as with temperature and calcination conditions. Thus, when heated to about 1350° F. an endothermic reaction occurs. Essentially all of the water of hydration associated with the uncalcined kaolin crystals is eliminated and an essentially amorphous (as measured by X-ray diffraction) material referred to as "metakaolin" results. Generally, the clay darkens significantly during the conversion to metakaolin. During the transformation to metakaolin, the abrasiveness of the material increases, even if the kaolin undergoing calcination is of high purity.

If the kaolin is heated under conditions in excess of those required to result in conversion to metakaolin, further significant changes in phases and properties occur when calcination conditions are sufficiently severe to cause the material to undergo an exothermic reaction (which typically occurs at about 1850° F. and varies from clay to clay). It is now conventional to refer to such material as "fully calcined kaolin".

A remarkable change in the brightness of the kaolin takes place when it is calcined to undergo the exothermic reaction. Thus, crude of the type containing well-crystallized kaolin which initially has a G.E. brightness of 80% may decrease to about 75% when calcined to metakaolin, and a brightness of 90% or higher when heated through the exotherm. For this reason it is conventional to control the operations of kaolin calciners to produce calcined kaolin of desired brightness. A corollary to the usual increase in brightness associated with full calcination is an undesirable increase in abrasivity.

Another change in the physical properties of kaolin that occurs as a result of calcination of powdered raw clay is the remarkable increase in opacifying properties, manifest by increase in light scatter of the clay (increased opacification).

Inspite of the abundance of kaolin crudes capable of providing bright, visually white fully calcined kaolin powders with the potential of opacifying paper products at a considerably lower cost than would be possible using high purity alumina or titania pigments, it took many years before the needs of the paper market could be satisfied by available calcined kaolin products because of the highly abrasive character of the fully calcined kaolin and the low brightness combined with abrasivity of the metakaolin form of the calcined kaolin.

The long-sought means to provide high brightness low abrasion calcined kaolin opacifying pigments awaited the discovery that a specific type of sedimentary kaolin clay crude would provide high brightness "white" calcined clay pigments with abrasivity sufficiently low to permit use by the paper industry. See U.S. Pat. No. 3,586,523, Fanselow et al (1969), the teachings of which are incorporated herein by cross-reference. The crudes, known as "hard" kaolins were of Tertiary origin and were characterized by containing extremely fine particles (e.g.., average particle size below ½ micron). When examined by X-ray these clays appeared to be less well crystallized than so-called "soft" kaolins. Generally, the iron content of these ultrafine Tertiary clays was of the order of about 0.7% to 0.9% by weight (expressed as $Fe_2O_3$) and in many cases the uncalcined clay had a distinctly grey color, hence the designation "grey kaolin".

When calcined in powder form these unique sedimentary clays aggregated to produce coarser particles possessing remarkably high opacifying power, but without the high abrasion generally characteristic of earlier calcined kaolins. The crudes found to be useful in the production of high brightness low abrasion calcined kaolin pigments were frequently lower in G.E. brightness, e.g., about 85%, than quality crudes used to provide high brightness uncalcined pigments. Nevertheless, when calcined, products with G.E. brightness of at least 90% were produced. When used as filler pigments in paper, the low abrasion calcined kaolin fillers also provided desired print-through resistance and color at acceptable burst levels.

Continued efforts to improve the quality of low abrasion calcined kaolin pigments and to reduce the manufacturing costs have been ongoing. For example, in U.S. Pat. No. 4,381,948, McConnell et al, the proposal was made to employ especially fine raw clay (100% by weight less than 1 micron) as feed to the calciner to improve opacification of the pigment when used as a paper filler. As in the case of Fanselow et al, the emphasis was on providing a high brightness (at least 93% G.E. in this case) and a "white" color.

This as well as other efforts retained the original expressed intent of the inventors in the '523 patent to maintain product brightness (at least about 90% G.E.) and whiteness. In fact, the low abrasion calcined kaolin pigments presently widely used by the paper industry have a G.E. brightness of about 93%.

To the best of our knowledge, processing schemes presently commercially used to produce low abrasion calcined kaolin pigments invariably involve preliminary upgrading of fine particle size crude kaolin, dispersion in water to form a pulp, and removal of coarse particles (so-called "grit") followed by fractionation of the degritted pulp to recover the desired ultrafine particle size fraction, generally at least 100% by weight finer than 2 microns and at least 90% finer than 1 micron. In the case of McConnell et al, supra, fractionation was carried out to recover an ultrafine fraction which was 100% by weight finer than 1 micron. Fractionation, heretofore considered essential, has been followed optionally by removal of colored impurities and/or bleaching, drying (usually by means of a spray dryer), followed by pulverization, calcining and repulverization. With regard to the crudes, these have been of the ultrafine Tertiary kaolins of the type described in the '523 patent, with the general proviso that crude brightness be sufficiently high, e.g., no lower than about 80%, a restriction inherently restricting the content of colored impurities (notably ferruginous and titaniferous) to relatively low values. Typically, $Fe_2O_3$ content was approximately 1% by weight, e.g., 0.85–1.10%. See, for example, U.S. Pat. No. 4,381,948 McConnell et al which states "said crude preferably includes not more than 0.5% in total by weight of glass-forming metal oxides, such as potassium, sodium, magnesium, and calcium oxides, and not more than 1.5% by weight of iron, expressed as $Fe_2O_3$, nor more than 2% by weight of titanium, expressed as $TiO_2$". An illustration example of McConnell et al utilized a crude identified as a "hard kaolin" and reported to analyze 45% $SiO_2$; 37% $Al_2O_3$, 0.93% $Fe_2O_3$, 1.6% $TiO_2$; 0.15% CaO; 0.08% MgO, 0.10% $K_2O$, $Na_2O$ 0.07%, the balance (14%) "consisting principally of water together with a small amount of organic matter". This was consistent with the conventional desire to provide high brightness products, e.g., 91.5–93.5%.

The invention described in the '523 patent spawned the development of the vast scale industrial production of low abrasion calcined kaolin clay pigments and the exploitation of the pigments in industrial paper filling and coating. The preferred use of the calcined kaolin pigments as originally envisioned by the inventors in the '523 patent was to fill newsprint paper, a low basis weight, low brightness (e.g., 50–60% G.E. brightness) paper. Inspite of the fact that the newsprint industry was the segment of the paper industry initially targeted for use of low abrasion calcined clay fillers, the demand of the newsprint industry has had essentially no impact on the current vast market for the pigments for the reason that the cost of such pigments did not result in a cost-benefit to the manufacturer of newsprint (or other papers made from mechanical pulps). Thus, the major use of low abrasion calcined kaolin pigments has been to coat and/or fill higher quality (value added) papers.

Historically, newsprint and groundwood specialities have been produced using a blend of conventional stone groundwood as the primary furnish component (70–90%) in combination with the required amount of chemical pulp (typically 10–30%) to achieve acceptable paper machine and printing press runnability. Recent developments in mechanical pulping technology in conjunction with market demands for improved paper quality have produced a vast array of new mechanical pulps that are well suited for use in newsprint and groundwood specialty papers. Thermomechanical pulp (TMP), chemi-thermomechanical (CTMP), bleached chemi-thermomechanical (BCTMP), pressurized groundwood (PGW), refiner mechanical pulp (RMP), and chemirefiner pulp (CRMP) may be blended in various combinations or with conventional chemical pulps to produce fiber furnishes specifically designed for producing a given grade of paper. The blend ratio of the fiber components is usually determined by the best compromise of their scattering/strength relationships. For example, kraft pulp has high strength, but low scattering, while stone groundwood has good scattering but low strength.

Several types of pigments are commercially available to manufacturers of newsprint and groundwood specialties for use as fillers. Kaolin-based pigments, both hydrous and calcined, sodium-alumino-silicates, precipitated silicas, urea-formaldehyde condensates and trihydrated aluminas are all used as filler pigments in mechanical pulp-containing papers. The amount of filler that may be used is largely grade specific. The following table lists typical values and readily illustrate the differences in grade requirements and filler usage of various mechanical pulp-containing papers.

|  | Basis Weight ($g/m^2$) | % Brightness | % Filler Content | % Mech. Pulp |
|---|---|---|---|---|
| Newsprint | 44–49 | 55–60 | 0–4 | up to 100 |
| Directory/Catalogue | 29–40 | 55–60 | 0–4 | 60–85 |
| Hi-Brite Grades | 52–90 | 60–66 | 0–4 | 70–90 |
| $SC^{(1)}$ - "C" | 40–80 | 60–66 | $0-8^{(2)}$ | 70–90 |
| $SC^{(1)}$ - "B" | 40–80 | 64–68 | $9-17^{(2)}$ | 60–80 |
| $SC^{(1)}$ - "A" | 40–80 | 66–72 | $18-30^{(2)}$ | 60–70 |

[1] SC supercalendered grades
[2] Typically hydrous kaolins are the primary filler component The use of a retention aid or retention aid system is required when filler pigments are utilized in the production of mechanical pulp-containing papers. Once again, paper manufacturers have a broad spectrum of products to choose from. Retention aid systems currently being used can be broken down into three classifications: single component systems, dual component systems, and triple component systems. Within each classification, there are several system options available to the papermaker. The following table lists the three broad classifications and some of the more commonly used systems within each classification.

A. Single Component Retention Aid Systems

1. High molecular weight (HMW), low charge density cationic polyacrylamide (PAM)
2. High molecular weight, low charge density anionic PAM
3. High molecular weight, non-ionic polyethleneimine (PEI)

B. Dual Component Retention Aid Systems

1. Low molecular weight (LMW), high charge density cationic polyamine with HMW, low charge density cationic PAM
2. LMW, high charge density cationic polyamine with HMW, low charge density anionic PAM
3. Phenolic resin with polyethylene oxide (PEO)
4. Activated bentonite with HMW, low charge density cationic PAM C. Triple Component Retention Aid Systems 1. Activated bentonite with PEI and HMW cationic PAM
2. Activated bentonite with PEI and HMW anionic PAM Recently market demands for higher newsprint and uncoated mechanical pulp containing papers coupled with changes in the paper making process have created interest in filler pigments. Fine particle size, low abrasion calcined kaolin was determined to be an effective pigment for these applications because of its high opacifying power. However, the cost of producing these papers using fine calcined kaolin limited its acceptance.

It was determined that a lower-cost pigment having the opacifying properties of the commercially available fine low abrasion calcined kaolin would provide the incentive for these products to be more broadly used in newsprint or other mechanical papers.

THE INVENTION

Novel low abrasion calcined kaolin opacifying pigments of the invention are characterized by Hunter "Lab" (color) values as follows: "L" is within the rage of 91 to 94, typically 91.1 to 93.1, "a" is within the range of +1.0 to +2.4, typically +1.3 to +2.4, and "b" is within the range of +6.2 to +7.4. By way of comparison, the "L", "a" and "b" values of a commercial low abrasion calcined kaolin pigments supplied under the registered trademark, ANSILEX are: "L" is from 95.5 to 96.8, "a" is from +0.6 to −0.1 and "b" is from 3.8 to 4.7. Values for a higher brightness commercial pigment supplied under the registered trademark ANSILEX 93 are: "L" is from 94.4 to 97.4, "a" is from 0.3 to −0.2 and "b" is from 3.4 TO 4.7. Pigments of the invention surprisingly provide means to achieve a spectrum of desirable properties including brightness to newsprint and other mechanical-pulp containing papers inspite of the low brightness indicated by the low "L" values. Particle size is in the range of about 70–84% by weight finer than 2 microns.

The manufacture of the filler pigments of the invention necessitates the initial selection of a suitable crude source clay which should be about 75% by weight finer than 2 micrometers. Iron content of the crude must be at least about 1.2, preferably at least 1.4 wt% expressed as $Fe_2O_3$ and titanium content must be at least about 2, preferably at least 2.3 wt% expressed as $TiO_2$, all weights being on an "as is" basis, i.e., including the approximately 14% volatiles, principally water, removed by heating at temperatures above 1200° F. The selected crude is crushed and pulped with a limited amount of water to produce a high solids clay pulp (such that the clay solids content is no less than about 55% weight percent). A dispersant, preferably a polyacrylate salt, is used to fluidize the high solids pulp which is charged to a centrifuge operated to produce sufficient gravitational force to cause grit (particles larger than 325 mesh, U.S. Standard sieve) to separate from the pulp, leaving a slip of degritted clay which, contrary to prior art practice, is then spray dried without further fractionation, dilution or bleaching. The spray dried intermediate, in the form of pulverulent microspheres, is pulverized, fully calcined and repulverized substantially as described in the above referenced patents.

Several surprising results flowed from our efforts to develop a "lower" brightness calcined kaolin opacifying pigment at a reduced cost. Unexpected was the discovery that products having a brightness as low as 79% could brighten newsprint and other low brightness papers produced from mechanical pulp. At least equally surprising was our finding that calcined kaolin pigments with a distinctly pink hue could be used to fill such papers without significant detriment to the shade of the filled paper.

With regard to the manufacture of the pigments, it was unexpected that high iron, high titania crudes containing appreciably more iron and titania than used to make prior art low abrasion calcined kaolin pigments could be used as source clay without significant effect on abrasiveness.

Of profound importance regarding the desire to be able to supply pigments at reduced costs, was our discovery that the clay crudes suitable for providing pigments having the desired spectrum of properties did not require a fractionation step and therefore that the calciner could be charged with coarser size raw gray or white Tertiary clay than has been used heretofore without appreciable detriment to opacity and abrasiveness. Operating with unfractionated crude was contradicted by the accepted procedure of fractionation to segregate only the finest clay as feed to the calciner. By avoiding this fractionation step, we were able to operate with higher solids pulps than we could if fractionation were practiced, this resulting in reduced content of added water to be removed in the drying step proceeding calcination. Furthermore, costs for conventional bleaching and dewatering are eliminated.

DESCRIPTION OF PREFERRED EMBODIMENTS

The filler pigment of the invention enhances opacity, brightness, shade, print-through resistance and smoothness of standard newsprint and groundwood specialties. The pigment permits newsprint mills to achieve optical properties superior to that of unfilled newsprint at relatively low cost and results in optical and printing properties of lighter basis weight papers that are comparable to the performance of higher basis weight papers. In other words the novel filler pigment provides an economical means to upgrade newsprint. Generally, the new filler pigment is used in the manufacture of paper using mechanical-pulp containing furnishes at retained loading levels up to six weight percent. The newer mechanical pulps currently being used by the paper industry result in products that are stronger and brighter than products obtained with older forms of mechanical pulp but the paper products obtained with the current mechanical pulps tend to have lower light scattering efficiency and/or absorptive coefficients. Thus, the papers are less opaque and have poorer print-through resistance. Therefore, the high light scattering ability of fine low abrasion calcined kaolins is a means to compensate for the effects of lower light scattering and absorption of the newer pulps.

Filler pigments of invention are also useful in other mechanical papers such as highly filled supercalendered (SC) grades, directory grades and coating basestock for lightweight coated (LWC) grades.

SOURCE CLAY

Presently preferred clay for practice of the invention is a high-iron, high-titania content kaolin from a Tertiary deposit, described hereinbelow in an illustrative example. Typical properties are:

| | CHEMICAL ANALYSES, Wt. % | | | | | | | | |
|---|---|---|---|---|---|---|---|---|---|
| Range | $SiO_2$ % | $Al_2O_3$ % | LOI % | $Fe_2O_3$ % | $TiO_2$ % | $Na_2O$ % | CaO % | MgO % | $K_2O$ % |
| High | 44.5 | 37.5 | 14.5 | 1.8 | 3.1 | 0.2 | 0.1 | 0.1 | 0.1 |

| | | | | | | | | | |
|---|---|---|---|---|---|---|---|---|---|
| -continued | | | | | | | | | |
| Low | 44.0 | 36.9 | 13.6 | 1.2 | 2.0 | 0.0 | 0.03 | 0.3 | 0.03 |

| PSD (Particle Size Distribution) | | |
|---|---|---|
| % <2 micron | % <1 micron | % <.5 micron |
| High | 100 | 100 | 100 |
| Low | 88 | 85 | 70 |

PRE-CALCINATION PROCESSING

The crude clay is blunged in water containing a dispersant, preferably sodium polyacrylate, used in amount sufficient to disperse the clay in water to form a fluid pulp. The amount of dispersant added depends on the nature of the clay and, when using sodium polyacrylate such as Mayo 152A, is typically 6-8 pounds per ton of dry clay. The clay solids content of the pulp should be as high as is possible, such as 55% solids or higher, preferably at least 60%, consistent with being sufficiently fluid to permit rejection of grit in a centrifuge, for an example a solid bowl centrifuge of the type used by the kaolin industry employing greater than 600 "G"s. The grit is principally sand, mica and coarse kaolin. Most of the grit is coarser than 325 mesh (U.S. Standard) and may contain some entrapped finer particles. Sodium silicate, a dispersant widely used in processing kaolins, is not effective in dispersing kaolins of the type used in practice of the invention at the desired high solids content of 55% or higher.

The resulting degritted slip of kaolin, composed of particles typically in the size range of 88 to 92% finer than 2 microns, is spray dried and then pulverized, calcined in a rotary or horizontal calciner and repulverized. Contrary to prior practice of controlling calcining conditions to achieve a desired brightness, e.g., 90% or above, we prefer to operate our calciner to achieve a desired acid solubility value of less than 2.0% and above 0.0%, preferably less than 1.1% and above 0.5%. The term "acid-solubility" as used herein refers to a value obtained by leaching the kaolin with nitric acid and atomic absorption for chemical analyses. The value is expressed as a weight % loss.

The invention is applicable to producing newsprint and groundwood specialities of the types described hereinabove to produce filled sheets having basis weights ranging from 29 to 90 g/m$^2$ and brightness values from 55 to 72%. The pigment of the invention can be used as the sole filler or it an be blended with other fillers such as hydrous kaolin or it can be employed to extend titania.

Typical calcined kaolin pigments of the invention have a G.E. brightness in the range of 70-84%, usually 80-82%, a yellowness index in the range of 7 to 11% usually 8 to 10% and Hunter Lab values as shown, Einlehner Abrasion in the range of 10 to 30 mg, per 100,000 revolutions tested at 15% solids, usually 15-25 mg and a particle size distribution of 90-100% by weight finer than 5 microns, 70-84% finer than 2 microns, 60-70% finer than 1 micron, and 10 to 25% by weight finer than 0.5 micron, with a median particle size in the range of 0.75 to 1.0 micron. By way of comparison a commercial calcined kaolin pigment (ANSILEX 93) has a G.E. brightness of 92.5%, a yellowness index at about 4.4% and Einlehner Abrasion of 17 mg, and a particle size distribution of 96% by weight finer than 5 microns 84% by weight finer than 2 microns, 64% by weight finer than 1 micron, 18% by weight finer than 0.5 micron, and a median particle size of 0.76 micron.

Pigment brightness values referred to herein are determined with TAPPI test method T646 om86.

Burst strengths are determined according to TAPPI Test method T403 om 85.

Einlehner Abrasion Test—An Einlehner AT 1000 Abrasion tester with phosphor bronze wire discs is used to measure Einlehner Abrasion. The pigment slurry is prepared at 15 weight % solids using 150 dry grams of pigment at low shear with a laboratory mixer (Talboy or equivalent). The slurry is adjusted to a 7.0 pH using 5% TSPP solution or 1% solution of HCl. The screen is precleaned with a mild detergent and deionized water solution in an ultrasonic bath for 5 minutes, rinsed in deionized water and dried with isopropyl alcohol, then in an oven at 105° C. for 15 minutes. The screen is weighed to the nearest 0.1 mg. The test cylinder is assembled with the blue side up. The pigment slurry is poured into the cylinder, and the agitator lowered into pigment slurry. The test is run at setting 3 for 25 minutes (=43,500 revolutions). The instrument automatically shuts off when the test is complete. The agitator shaft is raised, and the cylinder and then the test screen are removed. The screen is washed, rinsed and dried by the same procedure used before running the test. The screen is weighed to the nearest 0.1 mg. The difference in the weight of the screen before and after the test is the weight loss (mg) per 43,500 revolutions. The Einlehner Abrasion is reported in mg/100,000 revolutions by multiplying the weight loss by 2.30.

Hunter "L", "a" and "b" values are obtained with a Gardner Instrument XL-20 using a 45/0 geometry. The Gardner uses a CIE Illuminant A and filters which in effect modifies the illuminant from Source A to Source C. Approximately 20 grams of the pulverized pigment sample used to measure pigment brightness is placed in a plexi-glass cylinder. Using a disc like implement, carefully depress the sample down. Care should be taken in producing a smooth surface for optimum results. Adjust the Gardner instrument to the large optics setting. Place clear plexi-glass plate into open cylindrical area on top of instrument to prepare for calibration. Place calibration tile over glass and calibrate the instrument to read the appropriate values for that calibration tile. Calibration through a plexi-glass plate removes the effect of the plexi-glass sample holder. After calibration remove calibration tile and plexi-glass plate. Depress the "L", "a", and "b" buttons and record the readings. The readings obtained are reported as Hunter L,a,b. The Hunter L,a,b. values are measured in the same manner that paper is measured by TAPPI standard method T524 om86.

Yellowness index is determined by modification of ASTM E313-73 using the equation $$YI = 100 \times \left(1 - \frac{R457}{R570}\right).$$

The ASTM procedure is modified by substituting R457nm for R 455nm and substituting R570 nm for R 557 hm. R457=Elrepho filter 8 and R570 nm=Elrepho filter 3.

EXAMPLE

This example illustrates processing a selected kaolin crude to produce an 80.6% brightness product of the invention, having 10.7 yellowness index and median size of 0.73 mm.

The kaolin crude used in this example from a deposit forming part of the Mid-Georgia Huber formation of Tertiary age, existing as beads, lense and boulders associated with sands deposited in a marine or brackish water environment. The deposit typically has tubular features, and a spaghetti-like form is especially prevalent in section of the deposit. The deposit is composed of several clay minerals with kaolinite forming 60 to 90% of the total. Quartz sand is a major impurity and minor impurities are muscovite or sericitic mica, biotite mica, anatase, various forms of iron sulfides and oxides, traces of zircon, tourmaline, kyanite and graphite.

Crude kaolin was blunged in water at 63.8% solids using sodium polyacrylate dispersant to provide a fluid pulp having a pH of 9.3. The pulp was degritted in a Bird centrifuge and adjusted to about 55% solids prior to spray drying. The 55% solids slurry was spray dried in a conventional dryer. Samples of prepulverized spray dried beads were placed in small ceramic boats and calcined for 40 minutes at 1900° F.

The calciner discharge products were cooled and pulverized twice through a 0.020 inch screen.

The resulting experimental calcined kaolin pigment of the invention had the properties listed below along with those for ANSILEX 93 pigment.

TABLE I

| | Pigment & Invention | Ansilex 93 |
|---|---|---|
| G. E. Brightness, % | 80.6 | 92.5 |
| Yellowness Index, % | 10.7 | 4.4 |
| Hunter Color | | |
| L | 93.1 | 96.8 |
| a | 1.6 | −0.2 |
| b | 6.9 | 3.1 |
| Einlehner Abrasion, mg. | 15 | 17 |
| Particle Size Distribution | | |
| Percent finer than | | |
| 5 um | 92 | 96 |
| 2 um | 72 | 84 |
| 1 um | 65 | 64 |
| 0.5 um | 18 | 18 |
| Median, um | 0.73 | 0.76 |

EXAMPLE II

A pulp blend of 75% unbleached groundwood and 25% bleached softwood kraft with a 150 CSF (TAPPI method T227 om85) was used in the evaluation. The filler pigments were added incrementally to produce handsheets with increasing net mineral contents. Hydrous aluminum sulfate (2% on dry furnish) was added to the furnish and the pH of the furnish was adjusted to 4.5 with dilute sodium hydroxide or dilute sulfuric acid. Handsheets were formed, pressed and dried on an M/K Systems Inc. Miniformer automated sheetformer at a target basis weight of 29 lb/3000 ft². A high molecular weight, low charge density, cationic polyacrylamide retention aid was added just prior to sheet formation at a rate of 0.5 lb/ton of furnish to ensure satisfactory pigment retention. The sheets were conditioned 24 hours at 73° F. and 50% relative humidity and then supercalendered 2 nips at 73° F. and 500 PLI (pounds per lineal inch). After reconditioning 24 hours, the optical and strength properties of the sheets were evaluated using the procedures listed below.

Paper Brightness—Paper brightness was measured in accordance to CPPA (Canadian Pulp and Paper Association) standard method E.J. (Revised August, 1986).

Opacity—Diffuse opacity (printers opacity) was measured in accordance with TAPPI standard method T519 om86. 89% reflectance backing opacity was measured in accordance with TAPPI standard method T425 om86.

Burst Strength—Burst strength was determined in accordance with TAPPI standard method T403 om 85.

Print Through Resistance—Sheets were printed on a Vandercook Proof Press using a 25 um wedge printing plate and Inmont Newspaper Black OA183 offset ink. Print through resistance was determined by measuring reflectances from the reverse side of a printed sample on a Technidyne BNL-2 opacimeter after standardizing the opacimeter to 100 on the unprinted paper backed by the white body. Print though resistance was measured at 2.5 cm, 6.0 cm, 9.5 cm, 13.0, and 16.5 cm from the start of the wedge. The optical densities of these same positions of the wedge were measured using a MacBeth reflection densometer RD-514. Print through resistance at 1.0 optical density was determined via multiple regression analysis. The reported print through resistance are at 1.0 optical density.

Paper Hunter LAB—Hunter LAB of the handsheets were determined in accordance with TAPPI Standard method T527 su72.

Results are summarized in Tables 2 and 3 for properties at 3 and 6% net mineral contents, respectively.

TABLE II

NEWSPRINT FILLER STUDY SUMMARY TABLE

| Property | Unfilled | Pigment of Example 1 | Ansilex 93 |
|---|---|---|---|
| % N.M.C. | 0.0 | 3.0 | 3.0 |
| Basis Weight, | | | |
| g/m² | 47.2 | 47.2 | 47.2 |
| lbs/3000 ft.² | 29.0 | 29.0 | 29.0 |
| Brightness, % | 58.2 | 59.9 | 60.5 |
| TAPPI Opacity, % | 86.2 | 87.6 | 87.8 |
| Hunter Color | | | |
| L | 85.52 | 86.23 | 86.40 |
| a | 0.54 | 0.56 | 0.61 |
| b | 12.86 | 12.39 | 12.11 |
| Delta L | 0.00 | 0.71 | 0.88 |
| Delta a | 0.00 | 0.02 | 0.07 |
| Delta b | 0.00 | −0.47 | −0.75 |
| Burst Index | 0.66 | 0.60 | 0.65 |

TABLE III

NEWSPRINT FILLER STUDY SUMMARY TABLE

| Property | Unfilled | Pigment of Example 1 | Ansilex 93 |
|---|---|---|---|
| % N.M.C. | 0.0 | 6.0 | 6.0 |
| Basis Weight, | | | |

TABLE III-continued

NEWSPRINT FILLER STUDY SUMMARY TABLE

| Property | Unfilled | Pigment of Example 1 | Ansilex 93 |
|---|---|---|---|
| g/m² | 47.2 | 47.2 | 47.2 |
| lbs/3000 ft.² | 29.0 | 29.0 | 29.0 |
| Brightness, % | 58.2 | 61.5 | 62.5 |
| TAPPI Opacity, % | 86.2 | 89.0 | 89.1 |
| Hunter Color | | | |
| L | 85.52 | 86.86 | 87.20 |
| a | 0.54 | 0.56 | 0.59 |
| b | 12.86 | 11.88 | 11.47 |
| Delta[1] L | 0.00 | 1.34 | 1.68 |
| Delta a | 0.00 | 0.02 | 0.05 |
| Delta b | 0.00 | −0.98 | −1.39 |
| Burst Index | 0.66 | 0.52 | 0.58 |

[1]Change in property from that of the unfilled sheet; i.e., Filled Paper Value (L,a,b) minus unfilled Paper Value.

The results of the handsheet study showed that:

B&L Opacity: Pigment of the invention and Ansilex 93 produced equivalent opacity.

G.E. Brightness: Pigment of the invention and Ansilex 93 both increase sheet brightness, but the pigment of the invention produces lower brightness than Ansilex 93 as a result of its lower pigment brightness.

Hunter Color Values: Overall, the pigment of the invention and Ansilex 93 imparted equivalent color properties although sheets with pigment of the invention were less red. As expected, the pigment of the invention develops slightly lower L values due to its lower pigment brightness and whiteness. Both pigments reduce sheet yellowness; however, the pigment of the invention has less of an effect than Ansilex 93.

Burst Index: The pigment of the invention and Ansilex 93 are essentially equivalent in Burst Index.

We claim:

1. A method for making a low abrasion kaolin clay pigment suitable for filling paper produced from mechanical pulp which comprises selecting a kaolin crude composed of kaolin particles having a low crystallinity index, a G.E. brightness below 82%; a particle size distribution such that at least 75% by weight is finer than 2 microns; said kaolin containing at least 1.2%, by weight $Fe_2O_3$ and at least 2% by weight $TiO_2$, forming said selected crude clay into a dispersed aqueous pulp containing at least about 55% clay solids, centrifuging said pulp to remove grit, and, without subjecting the resulting degritted slip to bleaching or further particle size fractionation, spray drying said slip to produce pulverulent microspheres, pulverizing the microspheres, calcining the pulverized microspheres until the kaolin undergoes at least partially the characteristic kaolin exotherm, and repulverizing the resulting calcined clay having a G.E. brightness from 70 to 84%.

2. The method of claim 1 wherein the $Fe_2O_3$ content of said crude is in the range of about 1.2 to 1.5% and the $TiO_2$ content is in the range of about 2.0 to 2.2%.

3. The method of claim 1 wherein the pulverized microspheres are calcined under conditions such that the repulverized calcined product has Hunter Tristimulus "L", "a" and "b" values in the range of 91–94, +1 to +2.2, and +6.2 to +7.4, respectively.

* * * * *